April 1, 1930.  W. R. BUSENBARK  1,752,883
FRAME FOR LICENSE PLATES
Filed July 20, 1927
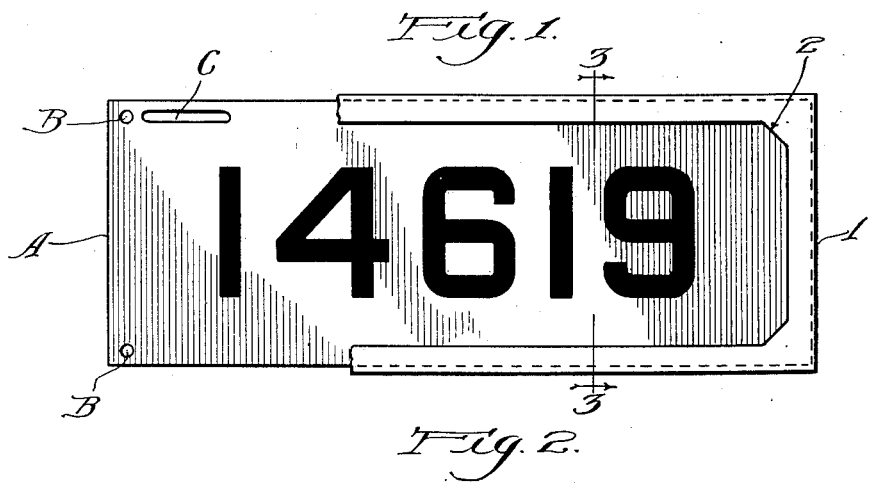
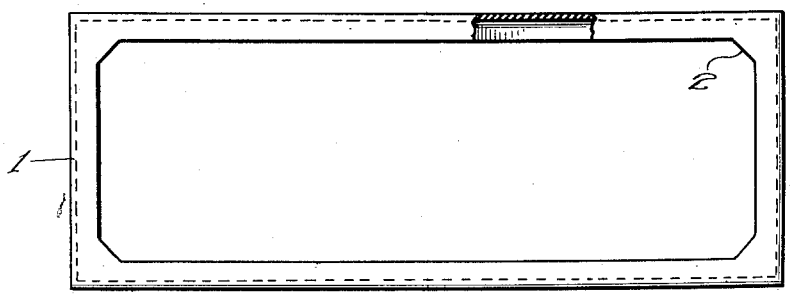
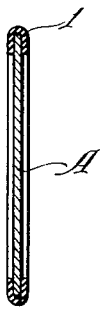
Inventor:
William R. Busenbark,
by Wm. F. Freudenreich,
Atty.

Patented Apr. 1, 1930

1,752,883

UNITED STATES PATENT OFFICE

WILLIAM R. BUSENBARK, OF AKRON, OHIO

FRAME FOR LICENSE PLATES

Application filed July 20, 1927. Serial No. 207,310.

The metal license plates carried by automobiles, while enamelled on their faces, usually have unsightly raw edges. Furthermore, these plates have in the four corners holes to receive fastening means together with slots near the upper corners to receive alternative fastening means. The result is that on account of the raw edges, the exposed parts of the fastening devices, and the unused holes or slots, the license plates are rather unsightly.

The object of the present invention is to provide a license plate with a simple and novel attachement that will conceal the raw edges and the areas in which the fastenings occur, thus giving the license plate a finished, attractive appearance.

In carrying out my invention I make a rubber frame, channel shaped in cross-section and the same shape as the license plate, and stretch this frame over the plate so that the latter lies in the groove or channel of the frame. The frame is preferably made slightly smaller than the plate, so that it will grip the latter tightly. The width of the elements of the frame is such that the openings for the fastening means will be concealed by the frame, thus leaving only the unbroken enamelled face with its license legend exposed. Therefore, viewed in one of its aspects, the present invention may be said to have for its object to produce a simple and novel frame adapted to be quickly and easily applied to a license plate and be securely held thereon.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein: —

Figure 1 is a front view of an automobile license plate having one of my frames applied thereto, one end of the frame being broken away; Fig. 2 is a front view of the frame detached from the plate, a fragment of the frame being broken away; and Fig. 3 is a section taken on line 3—3 of Fig. 1.

Referring to the drawing, A represents an automobile license plate having in the four corners holes B, B and at the top near the ends elongated slots C. This plate is therefore simply the usual license plate at present in use.

I have provided a frame 1 of rubber whose elements are comparatively narrow, only slightly wider than the distance between the holes and slots from the adjacent edges of the plate. The elements of the frame are channel-shaped, the open sides of the channels being directed inwardly so as to provide a continuous groove or channel surrounding the opening in the frame. The frame is preferably so proportioned that the distance from the bottom of the groove or channel in one element of the frame to the bottom of the groove or channel in the opposite element is slightly less than the corresponding dimension of the license plate; whereby the frame as a whole will remain in a stretched condition when it is placed around the license plate, in order that the frame will grip the plate tightly and not be loose thereon. The frame is preferably widened at the corners, as indicated at 2, either by rounding the corners of the opening in the frame or by cutting off these corners along diagonal lines; thus insuring that the frame will be wide enough at the corners effectively to cover large screw heads or the like on fastening devices extending through the holes B in the plate.

The frame may be made in any desired color, either to correspond with the color of the plate or with the color of the automobile.

It will therefore be seen that my invention does away with the unsightliness of the ordinary automobile license plate and, by covering the raw edges, prevents them from accidentally cutting or scratching anyone whose hand may come in contact therewith, and also prevents threads or fibres from catching and remaining on the edges.

While I have illustrated and described with particularity only a single preferred form of my invention, I do not desire to be limited to the exact structural details thus illustrated and described; but intend to cover all forms and arrangements which come within the definitions of my invention constituting the appended claim.

I claim:

An attachment for an automobile license plate comprising a rectangular flexible elastic rubber frame whose elements are channel-shaped in cross-section to form an endless groove surrounding an opening in the frame, there being gussets in the corners to produce a widening of the frame at these points.

In testimony whereof, I sign this specification.

WILLIAM R. BUSENBARK.